(12) United States Patent
Huang et al.

(10) Patent No.: US 11,654,551 B2
(45) Date of Patent: May 23, 2023

(54) REDUNDANT ROBOTIC ARM CONTROL METHOD, REDUNDANT ROBOTIC ARM CONTROLLER, AND COMPUTER READABLE STORAGE MEDIUM

(71) Applicant: UBTECH ROBOTICS CORP LTD, Shenzhen (CN)

(72) Inventors: Liqun Huang, Shenzhen (CN); Xiaoyu Ren, Shenzhen (CN); Yuesong Wang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 236 days.

(21) Appl. No.: 17/134,565

(22) Filed: Dec. 28, 2020

(65) Prior Publication Data
US 2021/0197371 A1 Jul. 1, 2021

(30) Foreign Application Priority Data
Dec. 30, 2019 (CN) .......................... 201911403020.2

(51) Int. Cl.
*B25J 9/16* (2006.01)
*B25J 9/02* (2006.01)
*B25J 13/08* (2006.01)

(52) U.S. Cl.
CPC ............. *B25J 9/1607* (2013.01); *B25J 9/023* (2013.01); *B25J 9/1643* (2013.01); *B25J 9/1651* (2013.01); *B25J 13/085* (2013.01)

(58) Field of Classification Search
CPC ...... B25J 9/1651; B25J 13/085; B25J 9/1607; B25J 9/023; B25J 9/1643; G05B 2219/39529; G05B 2219/40367; G05B 2219/40599
See application file for complete search history.

(56) References Cited

U.S. PATENT DOCUMENTS

| | | | |
|---|---|---|---|
| 10,065,311 B1 * | 9/2018 | Buschmann | B25J 9/1664 |
| 10,369,700 B2 * | 8/2019 | Kuroda | A61B 34/30 |
| 2020/0055195 A1 * | 2/2020 | Ignakov | B25J 13/06 |

* cited by examiner

*Primary Examiner* — Khoi H Tran
*Assistant Examiner* — Rodney P King

(57) ABSTRACT

The present disclosure provides a redundant robotic arm control method, a redundant robotic arm, and a computer readable storage medium. The method includes: obtaining an external force acting on an end of the robotic arm and an external torque acting on each joint; calculating a first joint speed of each joint based on a degree of influence of the joint on the end in each motion dimension and the external force acting on the end; determining a zero space speed of each joint corresponding to a current position of the end based on a link torque of an external force acting on a link with respect to the joint; calculating a total joint speed based on the first joint speed and the zero space speed; and controlling the robotic arm to the move according to the total joint speed.

20 Claims, 5 Drawing Sheets

REDUNDANT ROBOTIC ARM CONTROL METHOD, REDUNDANT ROBOTIC ARM CONTROLLER, AND COMPUTER READABLE STORAGE MEDIUM

CROSS REFERENCE TO RELATED APPLICATIONS

The present disclosure claims priority to Chinese Patent Application No. 201911403020.2, filed Dec. 30, 2019, which is hereby incorporated by reference herein as if set forth in its entirety.

BACKGROUND

1. Technical Field

The present disclosure relates to automatic control technology, and particularly to a redundant robotic arm control method, a redundant robotic arm controller, and computer readable storage medium.

2. Description of Related Art

Robotic arm is to a complex system with high precision, multiple inputs and outputs, high nonlinearity, and strong coupling. Because of its unique operational flexibility, it has been widely used in industrial assembly, industrial safety, explosion-proof, and the like. Since the robotic arm is a complex system, it has uncertainties such as parameter perturbation, external interference, and un-modeled dynamics. Therefore, the modeling model of the robotic arm also has uncertainty. For different tasks, it is necessary to plan the motion trajectory of the joint space of the robotic arm, so as to cascade to form the end pose. For the robotic arm, it may encounter obstacles during motions, which will cause external forces to act on the robotic arm.

At present, when controlling the robotic arm in response to the external forces acting on the end of the robotic arm, it usually calculates the speed deviation of the end directly based on the force acting on the end of the robotic arm, and then adjusts the joints of the robotic arm according to the speed deviation of the end. When an external force acts on the robotic arm link, the control amount of the robotic arm will not change, and the robotic arm will collide with obstacles and produce a large impact force. If an adjustment method which is performed when an external force is acting on the end of the robotic arm is adopted, the robotic arm will drive the end of the robotic arm to move while the link has an external force acting thereon, which will cause the actual position of the end of the robotic arm to deviate from the trajectory of executing the main task.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
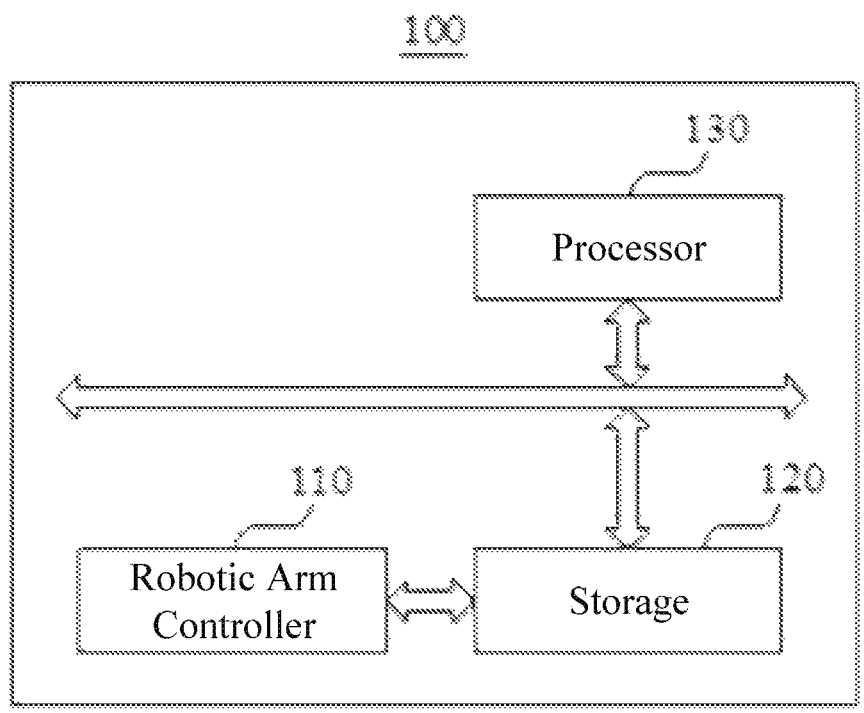
FIG. 1 is a schematic block diagram of a redundant robotic arm according to an embodiment of the present disclosure.

In order to make the objects, technical schemes and advantages of the present disclosure more clear, the technical solutions in the embodiments of the present disclosure will be clearly and completely described below with reference to the drawings. Apparently, the described embodiments are part of the embodiments of the present disclosure, not all of the embodiments. The components in the embodiments that are described and shown in the drawings may generally be arranged and designed in various configurations.

Therefore, the following detailed description for the embodiments provided in the drawings is not intended to limit the scope of the present disclosure, but merely represents the embodiments of the present disclosure. All other embodiments obtained by those skilled in the art without creative efforts are within the scope of the present disclosure.

It should be noted that, similar reference numerals and letters indicate similar items in the following figures. Therefore, once an item is defined in one figure, it will not be further defined and explained in subsequent figures.

In the description of the present disclosure, it should also be noted that, the terms "disposed", "installed", "connected to each other", and "connected" are to be understood broadly, unless otherwise expressly stated and limited. For example, they can represent a fixed connection, a detachable connection, or integral connection; can be mechanical connection or electrical connection; can be a direct connection, a connection with each other through an intermediate medium, or an internal communication between two elements. For those skilled in the art, the specific meaning of the above-mentioned terms in the present disclosure can be understood based on specific circumstances.

A robotic arm is a structure formed by connecting a plurality of links. In the robotic arm, there is a joint connected between every two links. The end of the robotic arm located at an end of the robotic arm that is not connected to a link of other structures is called an "end". During the motion of the robotic arm, in order to avoid damage to the robotic arm itself or exterior objects due to the obstructed task (i.e., the first task) when the robotic arm touches an obstacle, it usually adjust the motion state of the robotic arm when an external force acting on the robotic arm is detected, so that the robotic arm executes a new task (i.e., the second task), for example, moving the end of the robotic arm away from the obstacle in a specific trajectory after encountering the obstacle.

In the prior art, when an external force acting on the end of the robotic arm is detected, it will directly adjust the speed of the end to make the end to execute a new task. However, in this manner, once an external force is acting on the link of the robotic arm, it will affect the new task of the robotic arm so that the new task may be executed abnormally.

In order to solve the above-mentioned technical problems, the present disclosure provides a robotic arm control method for controlling a redundant robotic arm. The method will be described in detail below in conjunction with embodiments.

FIG. 1 is a schematic block diagram of a redundant robotic arm according to an embodiment of the present disclosure. A redundant robotic arm 100 is provided. As shown in FIG. 1, the robotic arm 100 includes link(s), joints(s) coupled to the link(s), a robotic arm controller 110 electrically connected to (servo(s) of) the joints(s), a storage 120 electrically connected to the robotic arm controller 110, and a processor 130. The storage 120 and the processor 130 are directly or indirectly electrically connected to each other for data interaction. For example, these components can be electrically connected to each other through one or more communication buses or signal lines. The robotic arm controller 110 is electrically connected includes at least one software functional module that can be stored in the storage 120 in the form of software or firmware or solidified in the operating system (OS) of the robotic arm 100. The processor 130 is for executing executable modules stored in the storage 120, for example, software functional modules included in the robotic arm controller 110, computer programs, and the like.

In the robotic arm, the motions of different joints have different influences on the motion of the end of the robotic arm. For a known robotic arm, a state equation of the influence of the rotational angle of each joint in the robotic arm on the position of the end is calculated first. An existing calculation method such as forward kinematics can be used. The Jacobian matrix J of the state equation (referred to as the first matrix hereinafter) can be obtained by calculating the partial derivative of the state equation. In which, the Jacobian matrix J is a matrix with M rows and N columns, and M is equal to the motion dimension of the end, N is equal to the number of the joints, the element at the i-th row and j-th column (0<i<M, 0<j<N) of the Jacobian matrix represents the degree of influence of the j-th joints on the motion of each end in the i-th motion dimension.

At the end of the robotic arm, a first sensor can be disposed to collect an external force acting on the end, and a second sensor can be disposed on each joint of the robotic arm to collect a torque acting on the joint that is generated by an external force acting on a link of the robotic arm connecting to the joint. In which, the first sensor is a force sensor, and the second sensor is a torque sensor. When the dimension (i.e., motion dimension) of the end of the robotic arm is 6, the first sensor may be a 6-dimensional force/torque sensor.

In this embodiment, the value collected by the first sensor is represented by $F_{ext}$, where $F_{ext}$ is a M×1 matrix, where its i-th element represents the component of the external force acting on the end in the i-th motion dimension. The torque collected by the second sensor is $\tau_{ext}$, where $\tau_{ext}$ is an N×1 matrix, where its j-th element represents the torque on the j-th joint. After the first sensor and the second sensor are configured, the value of the external force can be collected through the first sensor, and the value of the external torque of the corresponding joint can be collected through the second sensor. Then the above-mentioned Jacobian matrix and the values collected by the first sensor and the second sensor can be used jointly to determine the force acting on the entire robotic arm. The details are as follows:

if both the first sensor and the second sensor have values and $\tau_{ext}=J^T F_{ext}\neq 0$, it means that a force is acting on the end, where $J^T$ is the transpose of the Jacobian matrix J;

if only the torque sensor of the joint has a value, that is, $\tau_{ext}\neq 0$, $F_{ext}=0$, it means that a force is acting on the link;

if both have values and are of different magnitudes, that is, $\tau_{ext}\neq 0$, $F_{ext}\neq 0$, $\tau_{ext}\neq J^T F_{ext}$, it means that forces are acting on both the end and the link; and if both are zero, that is, $\tau_{ext}=0$, $F_{ext}=0$, there is no force acting on the robotic arm.

Figure 2:
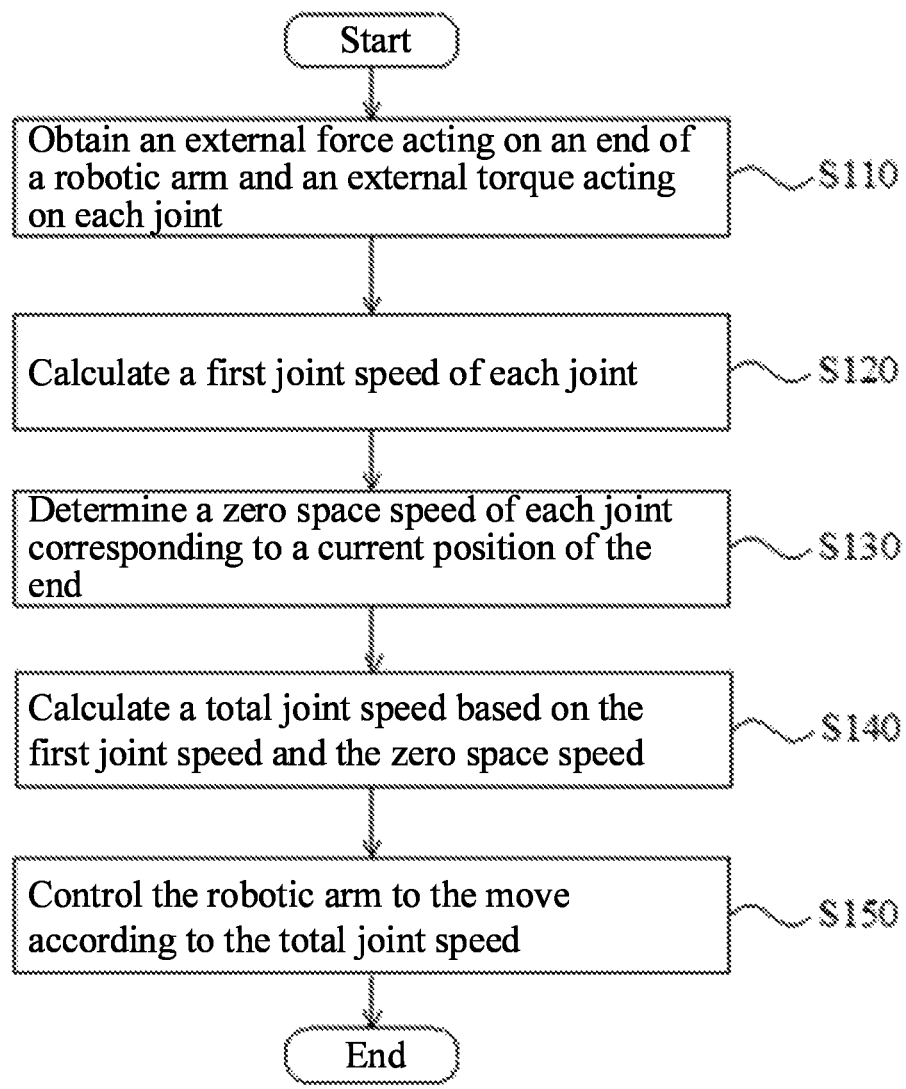
FIG. 2 is a flow chart of a first embodiment of a redundant robotic arm control method according to the present disclosure.

FIG. 2 is a flow chart of a first embodiment of a redundant robotic arm control method according to the present disclosure. In this embodiment, a control method for a controller electrically connected to a redundant robotic arm or for the redundant robotic arm itself is provided. The method is a computer-implemented method executable for a processor. In one embodiment, the method may be implemented through the redundant robotic arm of FIG. 1 or a redundant robotic arm controller shown in FIG. 5. As shown in FIG. 2, the method includes the following steps.

S110: obtaining an external force acting on an end of the robotic arm and an external torque acting on each joint.

S120: calculating a first joint speed of each joint.

In this embodiment, the first joint speed of each joint is calculated based on a degree of influence (e.g., position, speed, or other motion influence) of the joint on the end in each motion dimension and the external force acting on the end, where the first joint speed is a speed component of the external force acting on the end corresponding to the joint. As an example, the above-mentioned degree of influence can be a Jacobian matrix, and the speed of the end can be calculated based on the external force acting on the end, then the first joint speed of the joint can be calculated based on the Jacobian.

S130: determining a zero space speed of each joint corresponding to a current position of the end.

In this embodiment, the zero space speed of each joint corresponding to a current position of the end is determined based on a link torque of an external force acting on a link with respect to the joint, where the zero space speed is a speed of the joint when the end remains unchanged in position while the external force is acting on the link.

S140: calculating a total joint speed based on the first joint speed and the zero space speed.

S150: controlling the robotic arm to the move according to the total joint speed.

In this embodiment, a speed component of each joint to control the robotic arm in response to the external force is calculated through the external force acting on the end of the robotic arm, and simultaneously the external force acting on the link is mapped to a zero space of the end according to the zero space of the end so as to calculate the zero space speed of the joint in the zero space, and then the zero space speed and the first joint speed are superimposed to take as the control amount of the joint, so as to realize the control of each joint. Since the force acting on the link is mapped in the zero space of the end, when a force is acting on the link of the robotic arm, the link and the joint of the robotic arm will move in the zero space, so as to avoid the end of the robotic arm from being affected, and realize the compliant force of the robotic arm.

Figure 3:
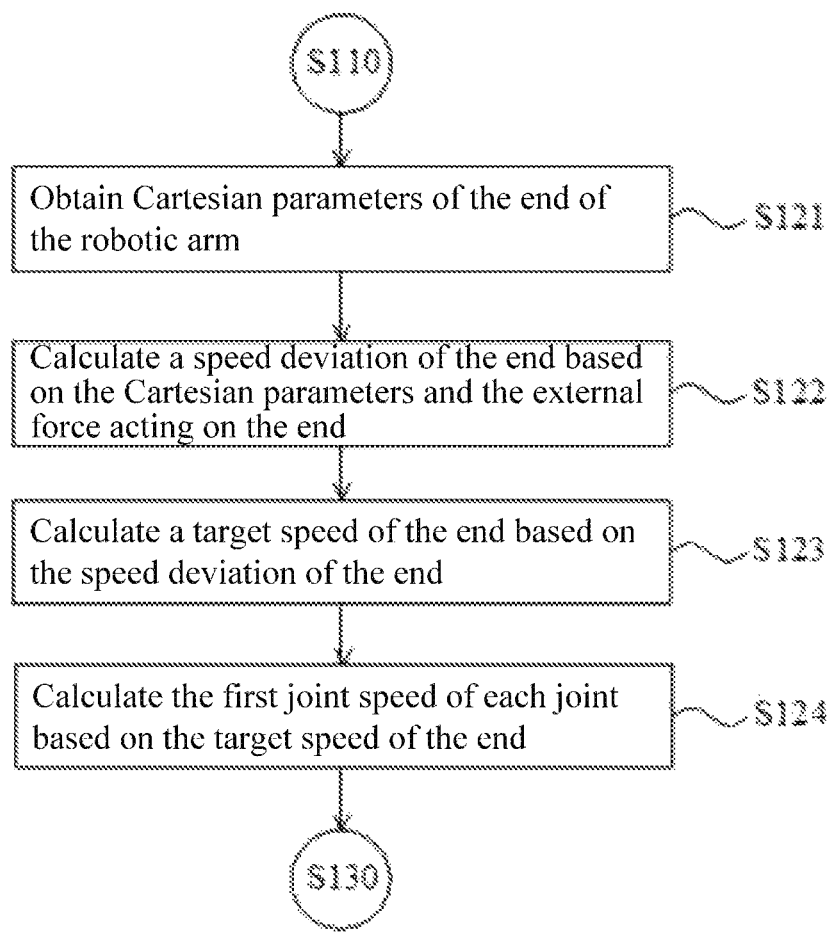
FIG. 3 is a flow chart of a second embodiment of a redundant robotic arm control method based on the redundant robotic arm control method of FIG. 2.

FIG. 3 is a flow chart of a second embodiment of a redundant robotic arm control method based on the redundant robotic arm control method of FIG. 2. As shown in FIG. 3, in this embodiment, the above-mentioned step of calculating the first joint speed of each joint based on the degree of influence of the joint on the end in each motion dimension and the external force acting on the end may include sub-steps S121-S124.

S121: obtaining Cartesian parameters of the end of the robotic arm, where the Cartesian parameters include an inertia parameter, a damping parameter, and a stiffness parameter of each dimension of the end.

In which, the larger the inertia parameter, the higher the stability of the robotic arm when subjected to external forces, the larger the damping parameter, the faster the energy dissipation of the robotic arm during collision, and the larger the stiffness parameter, the higher the accuracy of the position of the end. Therefore, the Cartesian parameters at the end of the robotic arm can be determined according to the performance required by the robotic arm.

S122: calculating a speed deviation of the end based on the Cartesian parameters and the external force acting on the end, where the speed deviation is a deviation between a current speed of the end and an expected speed of a blocked task.

The blocked task is the first task, and the expected speed is the current speed in the normal execution of the blocked task.

S123: calculating a target speed of the end based on the speed deviation of the end.

The target speed is the speed of the new task (i.e., the second task) executed by the target after encountering an obstacle.

S124: calculating the first joint speed of each joint based on the target speed of the end.

In the forgoing embodiment, the first joint speed of each joint is calculated based on the external force acting on the end.

According to the classic impedance control theory proposed by Hogan, in the case that the actual displacement of the robotic arm is x and the expected displacement of the robotic arm when executing a task is $x_d$, the relationship of an acceleration deviation $\ddot{\tilde{x}}$ of the end, the speed deviation $\dot{\tilde{x}}$ of the end, a displacement deviation $\tilde{x}$ of the end with respect to the external force acting on the end $F_{ext}$ is:

$$F_{ext}=M_e\ddot{\tilde{x}}+B_e\dot{\tilde{x}}+K_e\tilde{x}.$$

The speed deviation of the end is calculated based on the Cartesian parameters and the external force acting on the end through an equation of:

$$\dot{\tilde{x}} = \frac{s}{M_e s^2 + B_e s + K_e} F_{ext}.$$

In which, x is a matrix composed of the displacement components of the end in each dimension, and its element at the i-th row represents the displacement component of the end in the i-th dimension; $\dot{x}$ is a matrix composed of the velocity components of the end in each dimension, and its element at the i-th row represents the velocity component of the end in the i-th dimension; $\dot{x}_d$ is a matrix composed of the expected velocity component of the end in each dimension, and its element at the i-th row is the expected velocity component of the end in the i-th dimension; $\ddot{x}$ is a matrix composed of the acceleration components of the end in each dimension, and its element at the i-th row represents the acceleration component of the end in the i-th dimension; and $\ddot{x}_d$ is a matrix composed of the components of the expected acceleration of the end in each dimension, and its element at the i-th row is the expected acceleration component of the end in the i-th dimension.

$\tilde{x}=x-x_d$ is a matrix composed of the displacement deviation components of the end in each dimension, and its element at the i-th row represents the displacement deviation component of the end in the i-th dimension. $\dot{\tilde{x}}=\dot{x}-\dot{x}_d$ is a matrix composed of the velocity deviation component of the end in each dimension, and its element at the i-th row represents the velocity deviation component of the end in the i-th dimension. $\ddot{\tilde{x}}=\ddot{x}-\ddot{x}_d$ is a matrix composed of the acceleration deviation component of the end in each dimension, and its element at the i-th row represents the acceleration deviation component of the end in the i-th dimension. $F_{ext}$ is a matrix of the components of the external force acting on the end in each motion dimension. $M_e$ is a matrix composed of the inertia parameter of the end in each dimension, where the number of rows and columns of $M_e$ is equal to the motion dimension of the end, and its element at the i-th row and m-th column represents the inertia parameter component of the i-th dimension influenced by the m-th motion dimension, where 0<m<M. $B_e$ is a matrix composed of the damping parameter of the end in each dimension, where the number of rows and columns of $B_e$ is equal to the motion dimension of the end, and its element at the i-th row and m-th column represents the damping parameter component of the i-th dimension influenced by the m-th motion dimension. $K_e$ is a matrix composed of the stiffness parameter of the end in each dimension, where the number of rows and columns of $K_e$ is equal to the motion dimension of the end, and its element at the i-th row and m-th column represents the stiffness parameter component of the i-th dimension influenced by the m-th motion dimension; s is a Laplace transform.

After the speed deviation of the end is calculated, the target speed of the end when the second task is executed can be calculated based on the speed deviation of the end through an equation of:

$$\dot{x}_{cmd}=\dot{x}_d+\dot{\tilde{x}}.$$

Then, the first joint speed of each joint can be calculated based on the target speed of the end In this embodiment, the calculation can be performed based on the first matrix. In the case that the robotic arm is a redundant robotic arm, the first matrix is an irreversible matrix. Therefore, the pseudo-inverse of the first matrix can be used, where $JJ^+=I$, and I is an identity matrix. The $\dot{q}_{cmd}$ can be calculated through an equation of:

$$\dot{q}_{cmd}=J^+\dot{x}_{cmd}.$$

Figure 4:
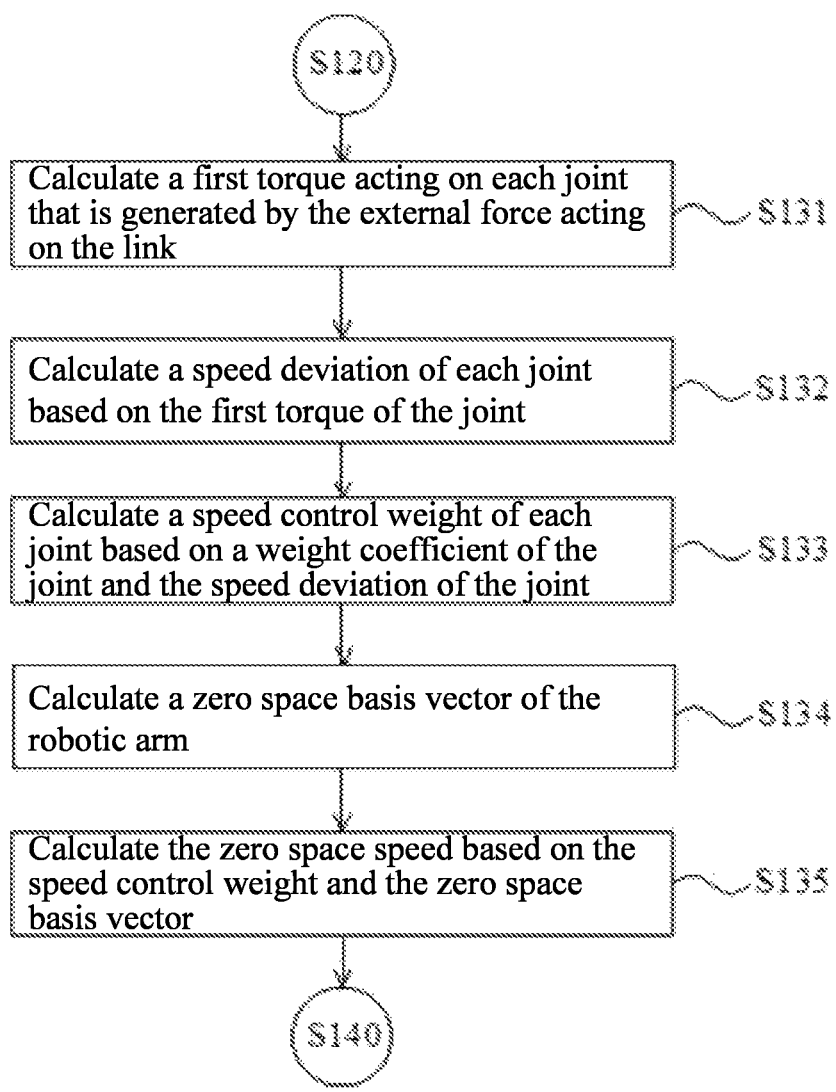
FIG. 4 is a flow chart of a third embodiment of a redundant robotic arm control method based on the redundant robotic arm control method of FIG. 2.

FIG. 4 is a flow chart of a third embodiment of a redundant robotic arm control method based on the redundant robotic arm control method of FIG. 2. As shown in FIG. 4, in this embodiment, the above-mentioned step of determining the zero space speed of each joint corresponding to the current position of the end based on the link torque of the external force acting on the link with respect to the joint may include sub-steps S131-S135.

S131: calculating a first torque acting on each joint that is generated by the external force acting on the link.

S132: calculating a speed deviation of each joint based on the first torque of the joint, where the speed deviation is a difference between an actual speed of the joint and an expected speed of the joint.

S133: calculating a speed control weight of each joint based on a weight coefficient of the joint and the speed deviation of the joint.

S134: calculating a zero space basis vector of the robotic arm.

In this embodiment, the zero space basis vector of the robotic arm is calculated based on a first matrix composed of the degree of influence of the joint on the end in each motion dimension and the external force acting on the end, where each element of the zero space basis vector represents the speed of a joint.

S135: calculating the zero space speed based on the speed control weight and the zero space basis vector.

In the forgoing embodiment, the effect of the external force acting on the link with respect to the joint is transformed into a zero space.

In this embodiment, the first torque acting on each joint by the external force acting on the link is calculated through equations of:

$$\tau_{ext}=\tau_{link}+J^T F_{ext};\text{ and}$$

$$\tau_{link}=\tau_{ext}-J^T F_{ext};$$

where, $\tau_{link}$ is a matrix composed of a torque acting on the joint that is generated by the external force acting on the link, $\tau_{ext}$ is a total amount of external torques acting on the joint, $J^T$ is the transpose of a matrix composed of the external force acting on the end and the degree of influence of the joint on the end in each motion dimension, that is, the transpose of the first matrix, $F_{ext}$ is a matrix of a component of the external force acting on the end in each motion dimension.

In this embodiment, the expected speed, the expected acceleration, and the expected displacement are the current corresponding speed, acceleration, and displacement of the end, respectively, when the first task is executed normally.

In this embodiment, q is a N×1 matrix composed of the current angular displacement of each joint, and its j-th element represents the current angular displacement of the j-th joint. $q_d$ is a N×1 matrix composed of a current expected angular displacement of each joint corresponding to the first task, its j-th element represents the expected angular displacement of the j-th joint. The angular velocity deviation of each joint is calculated based on each link torque through equations of:

$$\tau_{link} = M_J \ddot{\tilde{q}} + B_J \dot{\tilde{q}} + K_J \tilde{q};\text{ and}$$

$$\dot{\tilde{q}} = \frac{s}{M_J s^2 \to B_J s \to K_J}\tau_{link};$$

where, $\tilde{q}=q-q_d$ is a matrix composed of the angular displacement deviation of the joint, and its j-th element represents the angular displacement deviation of the j-th joint; $\dot{\tilde{q}}=\dot{q}-\dot{q}_d$ is a matrix composed of the angular velocity deviation of the joint, and its j-th element represents the angular velocity deviation of the j-th joint; $\ddot{\tilde{q}}=\ddot{q}-\ddot{q}_d$ is a matrix composed of the angular acceleration deviation of the joint, and its j-th element represents the angular acceleration deviation of the j-th joint; $M_J$ is a matrix composed of the inertia parameter of each joint, the number of its rows and columns is equal to the number of joints, and its element at the j-th row and n-th column represents the inertia parameter component of the j-th joint influenced by the n-th joint; $B_J$ is a matrix composed of the damping parameter of each joint, the number of its rows and columns is equal to the number of joints, and its element at the j-th row and n-th column represents the damping parameter component of the j-th joint influenced by the n-th joint; $K_J$ is a matrix composed of the stiffness parameter of each joint, the number of its rows and columns is equal to the number of joints, and its element at the j-th row and n-th column represents the stiffness parameter component of the j-th joint influenced by the n-th joint; and s is a Laplace transform, and 0<n<N.

The expected angular displacement is the current angular displacement of the joint when the first task is executed normally.

In this embodiment, since the first matrix has been obtained, the null space basis vectors Z of the first matrix can be calculated, and each element of these null space basis vectors represents the second joint speed of the corresponding joint without affecting the end displacement. The zero space speed of the joint can be calculated through an equation of:

$$\dot{q}_{null}=Z\lambda.$$

Based on the combination of these basis vectors, the joint can be controlled in the null space of the task executed by the end. That is, an optimized objective function can be constructed according to actual needs to obtain the optimal zero space speed in actual control requirements. For example, the minimum gravitational potential energy of the entire robot or the minimum distance to a certain point can be used as the optimized objective function.

The optimized objective function with the control requirement that the selected zero space speed control weight $\lambda$ minimizes the difference between the zero space speed $\dot{q}_{null}$ and the joint angular velocity deviation $\dot{\tilde{q}}$ calculated using the joint impedance is constructed as:

$$g(\dot{q}) = \frac{1}{2}(\dot{q}_{null} - \dot{\tilde{q}})^T W(\dot{q}_{null} - \dot{\tilde{q}}).$$

By calculating the derivative of the optimized objective function that has been constructed, and then substituting $\dot{q}_{null}=Z\lambda$ into the derived equation, it can obtain an equation of:

$$\left(\frac{\partial g(\dot{q})}{\partial \dot{q}}\right)^T = W(\dot{q}_{null} - \dot{\tilde{q}}) = WZ\lambda - \dot{\tilde{q}} = 0;$$

where, $g(\dot{q})$ is the optimized objective function value, $\lambda$ is a H×1 matrix, H is the dimension of zero space basis vectors, and W is a positive definite weight matrix where its each diagonal element is the weight of a joint.

In this way, the expression of $\lambda$ can be calculated as:

$$\lambda=(Z^T W^T W Z)^{-1} Z^T W^T W \dot{\tilde{q}};$$

and then the zero space speed is obtained as:

$$\dot{q}_{null}=Z\lambda=Z(Z^T W^T W Z)^{-1} Z^T W^T W \dot{\tilde{q}};$$

after the zero space speed is obtained, the total joint speed can be calculated.

The total joint speed is calculated through equations of:

$$\dot{q}_N=\dot{q}_{cmd}+\dot{q}_{null}=\dot{q}_{cmd}+Z\lambda;\text{ and}$$

$$\dot{q}_N=\dot{q}_{cmd}+Z(Z^T W^T W Z)^{-1} Z^T W^T W \dot{\tilde{q}}.$$

Figure 5:
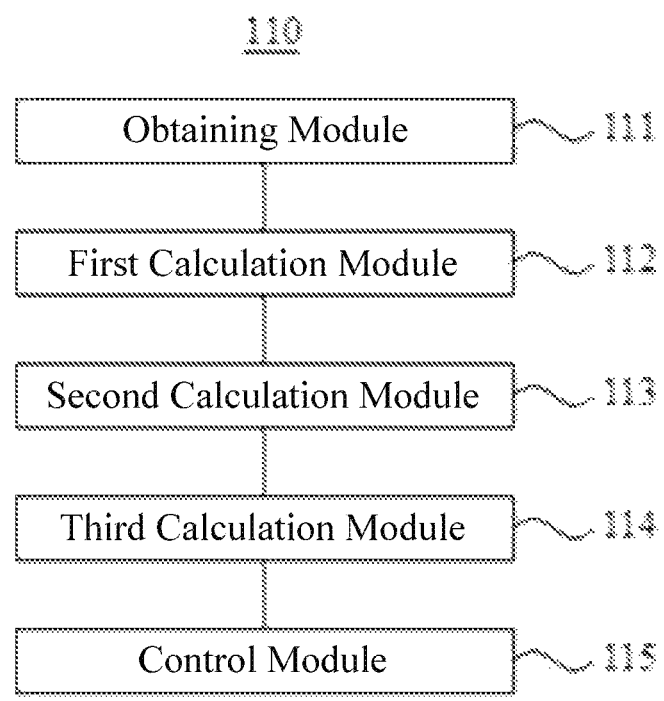
FIG. 5 is a schematic block diagram of a redundant robotic arm controller according to an embodiment of the present disclosure.

FIG. 5 is a schematic block diagram of a redundant robotic arm controller according to an embodiment of the present disclosure. In this embodiment, a redundant robotic arm controller 110 for controlling a redundant robotic arm is provided. In which, the redundant robotic arm may be a standalone redundant robotic arm having a controller for executing the above-mentioned redundant robotic arm control methods (see FIGS. 2-4). In other embodiments, the redundant robotic arm and the controller 110 may be installed on a robot. As shown in FIG. 5, the robotic arm controller 110 is electrically connected to the robotic arm and includes an obtaining module 111, a first calculation module 112, a second calculation module 113, a third calculation module 114, and a control module 115. The robotic arm controller 110 includes a software functional module that can be stored in a storage in the form of software or firmware or in the storage 120.

The obtaining module 111 is configured to obtain an external force acting on an end of the robotic arm and an external torque acting on each joint.

In this embodiment, the obtaining module 111 is configured to execute step S110. For a specific description of the obtaining module 111, refer to the description of step S110.

The first calculation module 112 is configured to calculate a first joint speed of each joint based on a degree of influence of the joint on the end in each motion dimension and the external force acting on the end, where the first joint speed is a speed component of the external force acting on the end corresponding to the joint.

In this embodiment, the first calculation module 112 is configured to execute step S120. For a specific description of the first calculation module 112, refer to the description of step S120.

The second calculation module 113 is configured to determine a zero space speed of each joint corresponding to a current position of the end based on a link torque of an external force acting on a link with respect to the joint, where the zero space speed is a speed of the joint when the end remains unchanged in position while the external force is acting on the link.

In this embodiment, the second calculation module 113 is configured to execute step S130. For a specific description of the second calculation module 113, refer to the description of step S130.

The third calculation module 114 is configured to calculate a total joint speed based on the first joint speed and the zero space speed.

In this embodiment, the third calculation module 114 is configured to execute step S140. For a specific description of the third calculation module 114, refer to the description of step S140.

The control module 115 configured to control the robotic arm to the move according to the total joint speed.

In this embodiment, the control module 115 is configured to execute step S150. For a specific description of the control module 115, refer to the description of step S150.

The present disclosure further provides a non-transitory computer readable storage medium. The storage medium stores one or more programs, and a processor can implement the method described in any one of the above-mentioned embodiments when executing the one or more programs.

The forgoing is only the various embodiment of the present disclosure, while the scope of the present disclosure is not limited thereto. For those skilled in the art, modifications or replacements that can be easily conceived within the technical scope of the present disclosure should be included within the scope of the present disclosure. Therefore, the scope of the present disclosure should be determined in accordance with the scope of the claims.

What is claimed is:

1. A computer-implemented control method for a controller electrically connected to a robotic arm, comprising steps of:

controlling, by the controller, the robotic arm to move, and obtaining an external force acting on an end of the robotic arm and an external torque acting on each joint when the robotic arm touches an obstacle, wherein the external force acting on the end of the robotic arm comes from the obstacle;

calculating a first joint speed of each joint based on a degree of influence of the joint on the end in each motion dimension and the external force acting on the end, wherein the first joint speed is a speed component of the external force acting on the end corresponding to the joint;

determining a zero space speed of each joint corresponding to a current position of the end based on a link torque of an external force acting on a link with respect to the joint by mapping the external force acting on the link in a zero space of the end of the robotic arm, wherein the zero space speed is a speed of the joint when the end remains unchanged in position while the external force is acting on the link;

calculating a total joint speed based on the first joint speed and the zero space speed; and controlling the robotic arm to move away from the obstacle according to the total joint speed.

2. The method of claim 1, wherein the step of calculating the first joint speed of each joint based on the degree of influence of the joint on the end in each motion dimension and the external force acting on the end comprises:

obtaining Cartesian parameters of the end of the robotic arm, wherein the Cartesian parameters comprise an inertia parameter, a damping parameter, and a stiffness parameter of each dimension of the end;

calculating a speed deviation of the end based on the Cartesian parameters and the external force acting on the end, wherein the speed deviation is a deviation between a current speed of the end and an expected speed of a blocked task;

calculating a target speed of the end based on the speed deviation of the end; and calculating the first joint speed of each joint based on the target speed of the end.

3. The method of claim 2, wherein the relationship of an acceleration deviation $\ddot{\tilde{x}}$ of the end, the speed deviations $\dot{\tilde{x}}$ of the end, a displacement deviation of the end with respect to the external force acting on the end $F_{ext}$ is:

$$F_{ext} = M_e \ddot{\tilde{x}} + B_e \dot{\tilde{x}} + K_e \tilde{x};$$

where, $F_{ext}$ is a matrix of a component of the external force acting on the end in each motion dimension;

the speed deviation of the end is calculated based on the Cartesian parameters and the external force acting on the end through an equation of:

$$\dot{\tilde{x}} = \frac{s}{M_e s^2 + B_e s + K_e} F_{ext};$$

where, $M_e$ is a matrix composed of the inertia parameter of each dimension of the end, $B_e$ is a matrix composed of the damping parameter of each dimension of the end, and $K_e$ is a matrix composed of the stiffness parameter of each dimension of the end, s is a Laplace transform.

4. The method of claim 1, wherein the step of determining the zero space speed of each joint corresponding to the current position of the end based on the link torque of the external force acting on the link with respect to the joint comprises:

calculating a first torque acting on each joint generated by the external force acting on the link;

calculating a speed deviation of each joint based on the first torque of the joint, wherein the speed deviation is a difference between an actual speed of the joint and an expected speed of the joint;

calculating a speed control weight of each joint based on a weight coefficient of the joint and the speed deviation of the joint;

calculating a zero space basis vector of the robotic arm based on a first matrix composed of the degree of influence of the joint on the end in each motion dimension and the external force acting on the end, wherein each element of the zero space basis vector represents the speed of a joint; and calculating the zero space speed based on the speed control weight and the zero space basis vector.

5. The method of claim 4, wherein the first torque acting on each joint generated by the external force acting on the link is calculated through equations of:

$$\tau_{ext} = \tau_{link} + J^T F_{ext}; \text{ and}$$

$$\tau_{link} = \tau_{ext} - J^T F_{ext};$$

where, $\tau_{link}$ is a matrix composed of a torque acting on the joint generated by the external force acting on the link, $\tau_{ext}$ is a total amount of external torques on the joint, $J^T$ is the transpose of the first matrix composed of the degree of influence of the joint on the end in each motion dimension and the external force acting on the end, $F_{ext}$ is a matrix of a component of the external force acting on the end in each motion dimension.

6. The method of claim 5, wherein the speed deviation of each joint is calculated based on the first torque of the joint through equations of:

$$\tau_{link} = M_J \ddot{\tilde{q}} + B_J \dot{\tilde{q}} + K_J \tilde{q}; \text{ and}$$

$$\dot{\tilde{q}} = \frac{s}{M_J s^2 + B_J s + K_J} \tau_{link};$$

where, $\tilde{q}$ is a matrix composed of a displacement deviation of the joint, $\dot{\tilde{q}}$ is a matrix composed of the velocity deviation of the joint, $\ddot{\tilde{q}}$ is a matrix composed of an angular velocity deviation of the joint, $M_J$ is a matrix composed of an inertia parameter of the joint, $B_J$ is a matrix composed of the damping parameter of the joint, $K_J$ is a matrix composed of the stiffness parameter of the joint, and s is a Laplace transform.

7. The method of claim 6, wherein the robotic arm is preset with an optimized objective function of:

$$g(\dot{q}) = \frac{1}{2}(\dot{q}_{null} - \dot{q})^T W (\dot{q}_{null} - \dot{q});$$

the speed control weight of each joint is calculated based on the weight coefficient of the joint and the speed deviation of the joint through an equation of:

$$\left(\frac{\partial g(\dot{q})}{\partial \dot{q}}\right)^T = W(\dot{q}_{null} - \dot{q}) = WZ\lambda - \dot{q} = 0;$$

where, $\dot{q}_{null}$ is the zero space speed.

8. A controller for a redundant robotic arm, comprising:
a processor;
a memory coupled to the processor; and
one or more computer programs stored in the memory and executable on the processor;
wherein, the one or more computer programs comprise:
instructions for controlling the robotic arm to move, and obtaining an external force acting on an end of the robotic arm and an external torque acting on each joint when the robotic arm touches an obstacle, wherein the external force acting on the end of the robotic arm comes from the obstacle;
instructions for calculating a first joint speed of each joint based on a degree of influence of the joint on the end in each motion dimension and the external force acting on the end, wherein the first joint speed is a speed component of the external force acting on the end corresponding to the joint;
instructions for determining a zero space speed of each joint corresponding to a current position of the end based on a link torque of an external force acting on a link with respect to the joint by mapping the external force acting on the link in a zero space of the end of the robotic arm, wherein the zero space speed is a speed of the joint when the end remains unchanged in position while the external force is acting on the link;
instructions for calculating a total joint speed based on the first joint speed and the zero space speed; and
instructions for controlling the robotic arm to move away from the obstacle according to the total joint speed.

9. The controller of claim 8, wherein the instructions for calculating the first joint speed of each joint based on the degree of influence of the joint on the end in each motion dimension and the external force acting on the end comprise:
instructions for obtaining Cartesian parameters of the end of the robotic arm, wherein the Cartesian parameters comprise an inertia parameter, a damping parameter, and a stiffness parameter of each dimension of the end;
instructions for calculating a speed deviation of the end based on the Cartesian parameters and the external force acting on the end, wherein the speed deviation is a deviation between a current speed of the end and an expected speed of a blocked task;
instructions for calculating a target speed of the end based on the speed deviation of the end; and
instructions for calculating the first joint speed of each joint based on the target speed of the end.

10. The controller of claim 9, wherein the relationship of an acceleration deviation $\ddot{\tilde{x}}$ of the end, the speed deviation $\dot{\tilde{x}}$ of the end, a displacement deviation $\tilde{x}$ of the end with respect to the external force acting on the end $F_{ext}$ is:

$$F_{ext} = M_e \ddot{\tilde{x}} + B_e \dot{\tilde{x}} + K_e \tilde{x};$$

where, $F_{ext}$ is a matrix of a component of the external force acting on the end in each motion dimension;
the speed deviation of the end is calculated based on the Cartesian parameters and the external force acting on the end through an equation of:

$$\dot{\tilde{x}} = \frac{s}{M_e s^2 + B_e s + K_e} F_{ext};$$

where, $M_e$ is a matrix composed of the inertia parameter of each dimension of the end, $B_e$ is a matrix composed of the damping parameter of each dimension of the end, and $K_e$ is a matrix composed of the stiffness parameter of each dimension of the end, s is a Laplace transform.

11. The controller of claim 9, wherein the instructions for determining the zero space speed of each joint corresponding to the current position of the end based on the link torque of the external force acting on the link with respect to the joint comprise:

instructions for calculating a first torque acting on each joint generated by the external force acting on the link;

instructions for calculating a speed deviation of each joint based on the first torque of the joint, wherein the speed deviation is a difference between an actual speed of the joint and an expected speed of the joint;

instructions for calculating a speed control weight of each joint based on a weight coefficient of the joint and the speed deviation of the joint;

instructions for calculating a zero space basis vector of the robotic arm based on a first matrix composed of the degree of influence of the joint on the end in each motion dimension and the external force acting on the end, wherein each element of the zero space basis vector represents the speed of a joint; and instructions for calculating the zero space speed based on the speed control weight and the zero space basis vector.

12. The controller of claim 11, wherein the first torque acting on each joint generated by the external force acting on the link is calculated through equations of:

$$\tau_{ext} = \tau_{link} + J^T F_{ext}; \text{ and}$$

$$\tau_{link} = \tau_{ext} - J^T F_{ext};$$

where, $\tau_{link}$ is a matrix composed of a torque acting on the joint generated by the external force acting on the link, $\tau_{ext}$ is a total amount of external torques on the joint, $J^T$ is the transpose of the first matrix composed of the degree of influence of the joint on the end in each motion dimension and the external force acting on the end, $F_{ext}$ is a matrix of a component of the external force acting on the end in each motion dimension.

13. The controller of claim 12, wherein the speed deviation of each joint is calculated based on the first torque of the joint through equations of:

$$\tau_{link} = M_J \ddot{\tilde{q}} + B_J \dot{\tilde{q}} + K_J \tilde{q}; \text{ and}$$

$$\dot{\tilde{q}} = \frac{s}{M_J s^2 + B_J s + K_J} \tau_{link};$$

where, $\tilde{q}$ is a matrix composed of a displacement deviation of the joint, $\dot{\tilde{q}}$ is a matrix composed of the velocity deviation of the joint, $\ddot{\tilde{q}}$ is a matrix composed of an angular velocity deviation of the joint, $M_J$ is a matrix composed of an inertia parameter of the joint, $B_J$ is a matrix composed of the damping parameter of the joint, $K_J$ is a matrix composed of the stiffness parameter of the joint, and s is a Laplace transform.

14. The controller of claim 13, wherein the robotic arm is preset with an optimized objective function of:

$$g(\dot{q}) = \frac{1}{2}(\dot{q}_{null} - \dot{q})^T W(\dot{q}_{null} - \dot{q});$$

the speed control weight of each joint is calculated based on the weight coefficient of the joint and the speed deviation of the joint through an equation of:

$$\left(\frac{\partial g(\dot{q})}{\partial \dot{q}}\right)^T = W(\dot{q}_{null} - \dot{q}) = WZ\lambda - \dot{q};$$

where, $\dot{q}_{null}$ is the zero space speed.

15. A non-transitory computer readable storage medium for storing one or more computer programs, wherein the one or more computer programs comprise:

instructions for controlling a robotic arm to move, and obtaining an external force acting on an end of the robotic arm and an external torque acting on each joint when the robotic arm touches an obstacle, wherein the external force acting on the end of the robotic arm comes from the obstacle;

instructions for calculating a first joint speed of each joint based on a degree of influence of the joint on the end in each motion dimension and the external force acting on the end, wherein the first joint speed is a speed component of the external force acting on the end corresponding to the joint;

instructions for determining a zero space speed of each joint corresponding to a current position of the end based on a link torque of an external force acting on a link with respect to the joint by mapping the external force acting on the link in a zero space of the end of the robotic arm, wherein the zero space speed is a speed of the joint when the end remains unchanged in position while the external force is acting on the link;

instructions for calculating a total joint speed based on the first joint speed and the zero space speed; and instructions for controlling the robotic arm to move away from the obstacle according to the total joint speed.

16. The non-transitory computer readable storage medium of claim 15, wherein the instructions for calculating the first joint speed of each joint based on the degree of influence of the joint on the end in each motion dimension and the external force acting on the end comprise:

instructions for obtaining Cartesian parameters of the end of the robotic arm, wherein the Cartesian parameters comprise an inertia parameter, a damping parameter, and a stiffness parameter of each dimension of the end;

instructions for calculating a speed deviation of the end based on the Cartesian parameters and the external force acting on the end, wherein the speed deviation is a deviation between a current speed of the end and an expected speed of a blocked task;

instructions for calculating a target speed of the end based on the speed deviation of the end; and instructions for calculating the first joint speed of each joint based on the target speed of the end.

17. The non-transitory computer readable storage medium of claim 16, wherein the relationship of an acceleration deviation $\ddot{\tilde{x}}$ of the end, the speed deviation $\dot{\tilde{x}}$ of the end, a displacement deviation $\tilde{x}$ of the end with respect to the external force acting on the end $F_{ext}$ is:

$$F_{ext} = M_e \ddot{\tilde{x}} + B_e \dot{\tilde{x}} + K_e \tilde{x};$$

where, $F_{ext}$ is a matrix of a component of the external force acting on the end in each motion dimension;

the speed deviation of the end is calculated based on the Cartesian parameters and the external force acting on the end through an equation of:

$$\dot{x} = \frac{s}{M_e s^2 + B_e s + K_e} F_{ext};$$

where, $M_e$ is a matrix composed of the inertia parameter of each dimension of the end, $B_e$ is a matrix composed of the damping parameter of each dimension of the end, and $K_e$ is a matrix composed of the stiffness parameter of each dimension of the end, s is a Laplace transform.

18. The non-transitory computer readable storage medium of claim 16, wherein the instructions for determining the zero space speed of each joint corresponding to the current position of the end based on the link torque of the external force acting on the link with respect to the joint comprise:

instructions for calculating a first torque acting on each joint generated by the external force acting on the link;

instructions for calculating a speed deviation of each joint based on the first torque of the joint, wherein the speed deviation is a difference between an actual speed of the joint and an expected speed of the joint;

instructions for calculating a speed control weight of each joint based on a weight coefficient of the joint and the speed deviation of the joint;

instructions for calculating a zero space basis vector of the robotic arm based on a first matrix composed of the degree of influence of the joint on the end in each motion dimension and the external force acting on the end, wherein each element of the zero space basis vector represents the speed of a joint; and instructions for calculating the zero space speed based on the speed control weight and the zero space basis vector.

19. The non-transitory computer readable storage medium of claim 18, wherein the first torque acting on each joint generated by the external force acting on the link is calculated through equations of:

$\tau_{ext} = \tau_{link} + J^T F_{ext}$; and $\tau_{link} = \tau_{ext} - J^T F_{ext}$;

where, $\tau_{link}$ is a matrix composed of a torque acting on the joint generated by the external force acting on the link, $\tau_{ext}$ is a total amount of external torques on the joint, $J^T$ is the transpose of the first matrix composed of the degree of influence of the joint on the end in each motion dimension and the external force acting on the end, $F_{ext}$ is a matrix of a component of the external force acting on the end in each motion dimension.

20. The non-transitory computer readable storage medium of claim 19, wherein the speed deviation of each joint is calculated based on the first torque of the joint through equations of:

$$\tau_{link} = M_J \ddot{\tilde{q}} + B_J \dot{\tilde{q}} + K_J \tilde{q}; \text{ and}$$

$$\dot{\tilde{q}} = \frac{s}{M_J s^2 + B_J s + K_J} \tau_{link};$$

where, $\tilde{q}$ is a matrix composed of a displacement deviation of the joint, $\dot{\tilde{q}}$ is a matrix composed of the velocity deviation of the joint, $\ddot{\tilde{q}}$ is a matrix composed of an angular velocity deviation of the joint, $M_J$ is a matrix composed of an inertia parameter of the joint, $B_J$ is a matrix composed of the damping parameter of the joint, $K_J$ is a matrix composed of the stiffness parameter of the joint, and s is a Laplace transform.

\* \* \* \* \*